Figure 1B:
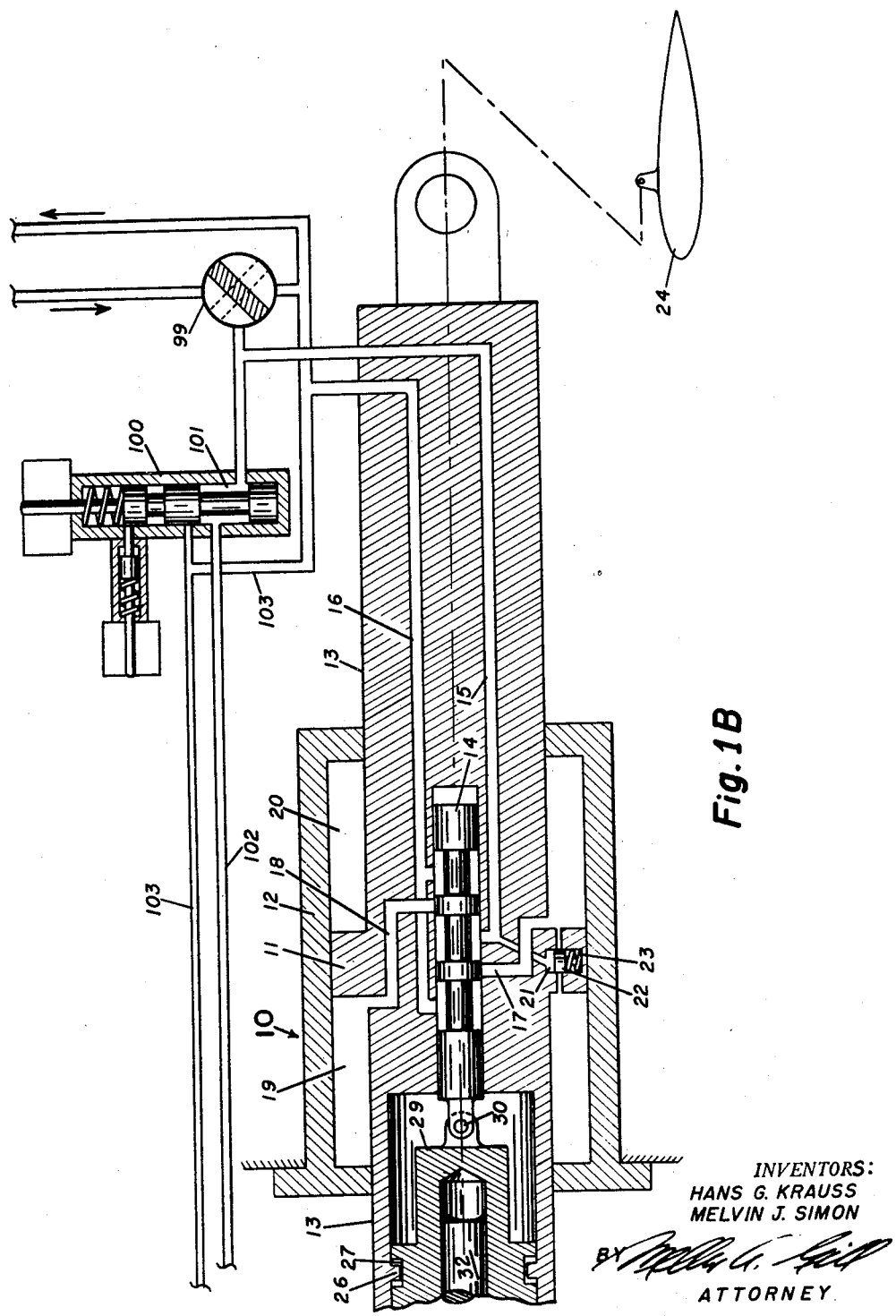

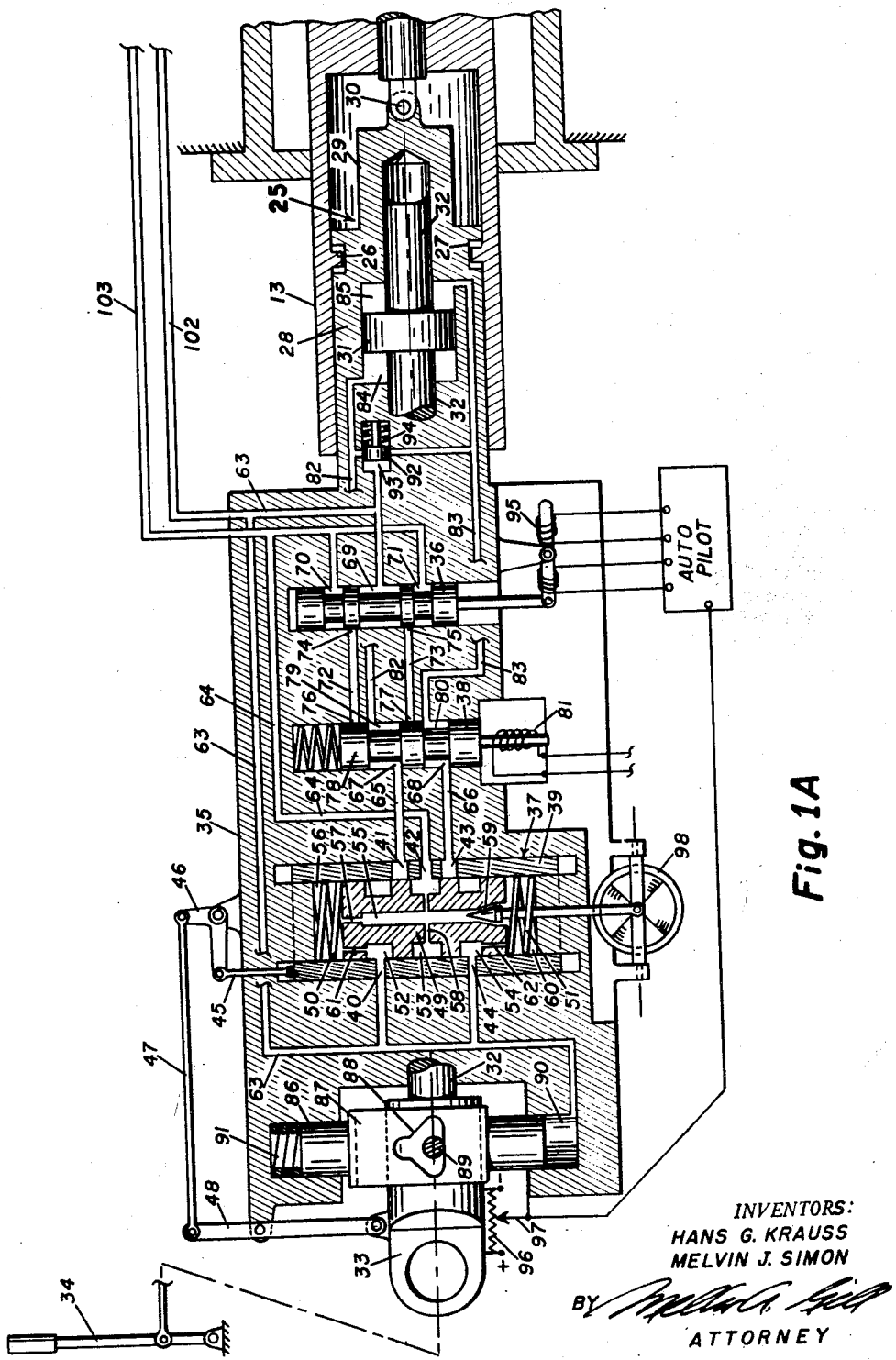

Sept. 13, 1960  H. G. KRAUSS ET AL  2,952,244
COMBINED STABILIZATION AND CONTROL SYSTEM
Filed Feb. 28, 1958  2 Sheets-Sheet 2

INVENTORS:
HANS G. KRAUSS
MELVIN J. SIMON

BY
ATTORNEY.

United States Patent Office 2,952,244
Patented Sept. 13, 1960

2,952,244

COMBINED STABILIZATION AND CONTROL SYSTEM

Hans G. Krauss, Bromall, and Melvin J. Simon, Havertown, Pa., assignors, by mesne assignments, to Boeing Airplane Company, Seattle, Wash., a corporation of Delaware Filed Feb. 28, 1958, Ser. No. 718,188

10 Claims. (Cl. 121—41)

This invention relates to aircraft and more particularly to hydraulic control means for aircraft responsive to both automatic stabilization and control devices and to manually operated means for adjusting a flight control instrumentality.

The primary object of the invention is to provide a manually and autopilot controlled boost system with automatic stabilization means integral therewith.

It is a further object to provide a boost system having a fluid motor and a single control valve therefor with means for controlling the valve from an autopilot, from additional stabilizing means and/or from the conventional pilot's control stick.

More specifically, it is an object of the invention to provide a boost system having a fluid motor and a single control valve therefor with means for selectively and/or simultaneously controlling the valve from an autopilot, from additional stabilizing means and from the conventional pilot's control stick. Further thereto, it is an object of the invention to provide means for coupling the pilot's control stick to the fluid motor for manual actuation thereof in the event of hydraulic pressure failure.

A still further object is to provide a boost system having a fluid motor and a single control valve therefor with valve control means responsive to automatic stabilization means integral therewith.

Other objects and advantages will become apparent from the following description when taken in conjunction with the accompanying drawings in which:

Figs. 1A and 1B combined, schematically illustrate one embodiment of the invention.

As shown in Figs. 1A and 1B, the fluid motor 10 comprises a piston 11 slidably mounted within a cylinder 12 which is secured to fixed aircraft structure. The piston is provided with a rod 13 which extends through both ends of the cylinder and which internally houses a control valve 14. The rod 13 is also provided with ducts 15 and 16 cooperating with the valve 14 for the supply of pressure fluid to the control valve 14 and the return thereof to a reservoir not shown, and is provided with ducts 17 and 18 cooperating with the valve 14 for selectively supplying pressure fluid to the chambers 19 and 20. Duct 15 also communicates with a chamber 21 contained within the piston 11 and in which is contained a piston 22 biased by a spring 23 to urge the piston 22 upwardly to thereby establish communication beween the chambers 19 and 20 when pressure is relieved from above the piston 22. One end of the rod 13 is operatively connected to a flight control instrumentality such as an elevator 24, while the other end of the rod is provided with a tubular portion in which is housed a second fluid motor 25. Lugs 26 formed on the inner surface of the tubular portion of the rod 13 cooperate with a circumferential groove 27 formed on the outer surface of the cylinder 28 to permit limited axial movement of the fluid motor 25 relative to the rod 13. The cylinder 28 is provided with an extension 29 which is connected to the control valve 14 by means of pin 30. Contained within the cylinder 28 is a piston 31 provided with a rod 32 which extends through both ends of the cylinder 28 and at its forward end is attached or secured to an input rod 33 which in turn is operatively connected to the pilot's control stick 34. Attached to or integral with the cylinder 28 of the fluid motor 25 is a housing 35 in which are contained control valves 36 and 37 and a selector valve 38, the purpose of which is to selectively render inoperative either of said control valves as will be explained more fully hereinbelow.

The control valve 37 comprises an axially displaceable sleeve element 39 provided with passages 40, 41, 42, 43 and 44 and to which is connected follow-up linkage comprising a link 45, a bellcrank 46 pivotally mounted on the housing 35, a link 47 and a lever 48 pivotally mounted on the housing 35 and pivotally connected to the input rod 33. Contained within the sleeve element 39 is an axially displaceable spool element 49 biased to its neutral position by springs 50 and 51, and provided with grooves 52, 53 and 54. The spool element is provided with a central bore 55 which communicates with an end chamber 56 through a bleed port 57 and which communicates with the groove 53 through a transverse passage 58.

The lower end of the bore 55 is adapted to receive a metering pin 59 and to form therewith a metering orifice. The grooves 52 and 54 communicate with the end chambers 56 and 60 respectively through bleed ports 61 and 62. Thus, pressure fluid communicated to the grooves 52 and 54 from the duct 63 and through the passages 40 and 44 is communicated to the end chambers 56 and 60. A return duct 64 communicates with the passage 42 and through the groove 53 and transverse passage 58 with the central bore 55. Ducts 65 and 66 connect passages 41 and 43 with ports 67 and 68 of the selector valve 38.

The control valve 36 is provided with a circumferential groove 69 which communicates with the pressure duct 63, and is provided with grooves 70 and 71 which communicate with the return duct 64. Ducts 72 and 73 connect ports 74 and 75 with ports 76 and 77 of the selector valve 38.

The selector valve 38 comprises an axially displaceable spool element 78 provided with grooves 79 and 80 and is adapted to cover the ports 76 and 77 communicating with the control valve 36 when in the position shown and to uncover those ports and cover ports 67 and 68 communicating with control valve 37 when displaced from the position shown by means of a solenoid or other actuator 81. Thus, when the selector valve 38 is in the position shown, the control valve 36 is rendered inoperative and when in a position to block off ports 67 and 68, the control valve 37 is rendered inoperative. Ducts 82 and 83 lead from the selector valve 38 to chambers 84 and 85 of the fluid motor 25.

Means are provided for coupling the input rod 33 to the housing 35 and hence indirectly to the fluid motor 25, and comprise a spring biased and fluid pressure operated locking member 86 carried by the housing 35 and provided with a sleeve or collar 87 having a V-shaped cutout 88 adapted, when in the lowermost position, to engage a cross-pin 89 carried by the input rod 33. However, when pressure fluid is admitted through pressure duct 63 to the chamber 90, the locking member 86 is displaced upwardly against the bias of the spring 91 to the position shown thereby decoupling the input rod 33 from the housing 35. Means are also provided for establishing a communication between the chambers 84 and 85 whereby the piston 31 will be centered relative to the cylinder 28 as the cross-pin 89 bottoms in the cutout 88. These means comprise a piston 92 contained within a chamber 93 communicating with the pressure duct 63 and biased by a spring 94 to urge the piston 92 to the left when pressure is relieved from the face of the piston 92.

The autopilot may be any one of several suitable types capable of producing an electrical signal indicating the departure and/or rate thereof of the aircraft from a desired flight attitude. The signal so produced is utilized to control a torque motor 95 which in turn is operatively connected to the control valve 36. Position feedback is obtained by means of a potentiometer 96 mounted on the input rod 33 and having an associated tap 97 mounted on the housing 35, which tap is electrically connected in the feedback loop of the autopilot. Additional stabilizing means are utilized to actuate the control valve 37 and comprise a rate gyro 98 mounted on the housing 35 and operatively connected to the metering pin 59. Position feedback is obtained by means of the follow-up linkage 45—48 connecting the input rod 33 to the sleeve element 39.

The hydraulic system comprises an "on-off" valve 99 to which pressure fluid is conducted from a source not shown and from which the pressure fluid is conducted to a two-position valve 100 and to the duct 15 contained within the piston rod 13. The valve 100 is provided with a circumferential groove 101 by means of which the pressure fluid is introduced in the line 102 when the valve is in the position shown, and thence to the pressure duct 63 in the housing 35. Return flow from the housing 35 is from the duct 64 through the return line 103 which communicates with the duct 16 in the piston rod 13 and thence to a reservoir not shown. When the valve 100 is in the other of its two positions, line 102 is vented to the reservoir through the groove 101 and return line 103.

The operation of the device will now be described. With the valve 99 in the "on" position shown and the valve 100 in the position shown, pressure fluid is conducted to control valve 14 contained within the piston rod 13 and to the control valves 36 and 37 contained within the housing 35 and through grooves 52 and 54, and bleed ports 61 and 62 to end chambers 56 and 60 of control valve 37. As shown, the position of the selector valve 38 is such that flow from the control valve 36 is blocked at ports 76 and 77 whereby the valve 36 is rendered inoperative and signals impressed thereon by the autopilot will not effect operation of the system. However, since control valve 37 is in communication with chambers 84 and 85 of the fluid motor 25 through ducts 65 and 66, ports 67 and 68 of the selector valve 38, and ducts 82 and 83, operation of valve 37 will effect operation of the fluid motor 25 which in turn will effect operation of the fluid motor 10 in the following manner. Signals from the rate gyro 98 cause a displacement of the metering pin 59 which in cooperation with the bore 55 of the spool element 49 causes an unbalance in pressure in the end chambers 56 and 60 which in turn causes an axial displacement of the spool element 49. Pressure fluid is thus admitted through either of the grooves 52 or 54 to the passages 41 and 43 and hence to the ducts 65 and 66. More specifically, if the rate gyro 98 is deflected in such manner as to raise the metering pin 59, the flow of pressure fluid from end chamber 60 to the central bore 55 will be restricted which in turn will cause an increase in pressure in end chamber 60 above that in end chamber 56. This unbalanced pressure acting on the ends of spool element 49 will raise the spool element to place groove 54 in communication with passage 43 whereby pressure fluid will be conducted to chamber 85 of fluid motor 25 through passage 43, duct 66, port 68, groove 80 and duct 83, while return flow from fluid motor 25 is from chamber 84 and through duct 82, groove 79, port 67, duct 65, passage 41 to groove 53 and thence through passage 42 to the return line 64. Since piston rod 32 is attached to the input rod 33 which is being held stationary by the pilot at the control stick 34 and/or by a bungee not shown, the admission of pressure fluid to chamber 85 of fluid motor 25 will cause a shift of the cylinder 28 to the right. This in turn, through pin connection 30, will shift valve 14 to the right whereby duct 18 is placed in communication with pressure duct 15 and duct 17 is placed in communication with return duct 16 to thus cause a displacement of the piston 11 and its associated rod 13 to the right. The bodily shift of cylinder 28 to the right, since the housing 35 is attached thereto, will shift the housing to the right which in turn, through the follow-up linkage 45—48 connecting the sleeve element 39 of the control valve 37 to the input rod 33, will cause an upward displacement of the sleeve element 39 whereby the passages 41 and 43 are no longer in communication with the respective grooves 53 and 54.

Pilot initiated motion at the control stick 34 is transmitted through the input rod 33 to the piston rod 32 attached thereto. This motion is transmitted through the fluid in the chambers 84 and 85 to the cylinder 28 and in turn through the pin connection 30 to the control valve 14. Thus, the pilot may control the actuation of the fluid motor 10 independently of the control afforded thereto by the rate gyro 98. Should the pilot desire to utilize the autopilot for controlling the aircraft, he will energize the solenoid 81 which will move the selector valve 38 to its uppermost position whereby flow from the control valve 37 is blocked at ports 67 and 68. Control valve 37 is thereby rendered inoperative and any signals impressed thereon by the rate gyro will not effect operation of the system. However, since the control valve 36 is in communication with chambers 84 and 85 of the fluid motor 25 through ducts 72 and 73, ports 76 and 77 of the selector valve 38, and ducts 82 and 83, operation of valve 36 will effect operation of the fluid motor 25 which in turn will effect operation of the fluid motor 10.

Signals from the autopilot indicating the departure of the aircraft from a desired flight attitude are transmitted to the torque motor 95 and thence to the control valve 36. If the autopilot signal be such as to cause a downward displacement of the valve 36, groove 69 will be placed in communication with port 75 and pressure fluid will be conducted to chamber 85 of the fluid motor 25 through duct 73, groove 80 of selector valve 38 and duct 83, while return flow from fluid motor 25 is from chamber 84 and through duct 82, groove 79 of selector valve 38, port 76, duct 72 to port 74 and thence through groove 70 to the return line 64. As before, the piston 31 remains stationary and the admission of pressure fluid to chamber 85 of fluid motor 25 will cause cylinder 28 to move to the right which in turn shifts valve 14 to the right thereby resulting in a displacement of piston 11 and its associated rod 13 to the right. Since the housing 35 is attached to the cylinder 28 and is shifted to the right therewith, the tap 97 slides relative to the potentiometer 96 mounted on the input rod 33 to thereby reduce the autopilot output signal being transmitted to the torque motor 95. As the attitude of the aircraft is corrected to that desired, the autopilot output signal diminishes until such time as the desired attitude is again attained and the control valve 36 is again in its neutral position as shown.

Should the pilot desire to override the autopilot control, motion initiated at the control stick 34 will be transmitted through the input rod 33 to the piston rod 32 and hence to the piston 31. As before, this motion is transmitted through the fluid in the chambers 84 and 85 to the cylinder 28 and in turn through the pin connection 30, to the control valve 14. Thus, the pilot may control the fluid motor 10 independently of the control afforded thereto by the autopilot.

In the event of a hydraulic failure in lines 102 or 103 or a malfunctioning of either the autopilot or the rate gyro systems, or should the pilot desire to control the aircraft without the aid of the autopilot or rate gyro, he will depressurize those systems by actuating the two-position valve 100 to its other position whereby line 102 is vented to the reservoir through groove 101 and return line 102. Chamber 90 is thereby vented to return and the locking member 86 is forced downwardly by the spring 91. Since chamber 93 is also vented to return, the piston 92 is urged to the left by the spring 94 to thereby establish a communication between chambers 84 and 85 of fluid motor 25 and permit the transfer of fluid from one chamber to the other. Cross pin 89 will ride on the surface of the V-shaped cutout 88 to center the piston 31 with respect to the cylinder 28 when bottomed in the V and at the same time establish through pin 89 and sleeve 87, a mechanical connection between the input rod 33 and the housing 35. A direct mechanical connection is thereby established between the input rod 33, through the housing 35, cylinder 28 and pin connection 30, to the control valve 14. Hence, pilot initiated motion of the control stick 34 will again be reflected in a displacement of the control valve 14 thereby resulting in actuation of the fluid motor 10.

In the event of a complete hydraulic system failure, or should the pilot elect to control the aircraft without the benefit of any boost, the valve 99 is rotated in the counter-clockwise direction to the "off" position shown by the dotted lines. In this position, flow of pressure fluid from the source is blocked at the valve, while duct 15 contained within the piston rod 13 is vented to return through the valve 99 and return line 103. Since chamber 21 is thereby vented to return, the piston 22 is urged upwardly by the spring 23 and establishes a communication between chambers 19 and 20 of the fluid motor 10 which permits the transfer of fluid from one chamber to the other. In such instance, pilot initiated motion of the control stick 34 will be reflected through the direct mechanical connection of input rod 33 through the housing 35 to the cylinder 28 and thence through the lost motion connection comprising the circumferential groove 27 and lugs 26 to the piston rod 13 thereby causing actuation of the elevator 24.

Thus, it is seen that the system provides for the manual actuation of the elevator 24, for the power control thereof in response to a pilot initiated control which may have superimposed thereon a stabilizing control, and for the power control thereof in response to signals from an autopilot which may be overridden by a pilot initiated control.

Although shown and described in what is believed to be the most practical and preferred embodiment, it is apparent that departures from the specific apparatus shown will suggest themselves to those skilled in the art and may be made without departing from the spirit and scope of the invention. We therefore do not wish to restrict ourselves to the particular forms of construction illustrated and described, but desire to avail ourselves of all modifications that may fall within the scope of the appended claims.

Having thus described our invention, what we claim is:

1. Hydraulic control means comprising a fluid motor having a stationary cylinder and a movable piston and rod, a control valve contained within said rod, a second fluid motor, said second fluid motor being contained within said rod and adapted for limited axial movement relative thereto, said second fluid motor having a cylinder operatively connected to said control valve, a piston and rod contained within the cylinder of said second fluid motor, a housing integral with said cylinder of said second fluid motor, a first valve element contained within said housing for controlling the admission of fluid to said second fluid motor, a second valve element contained within said housing for controlling the admission of fluid to said second fluid motor, and means contained within said housing for permitting flow of fluid through one of said valve elements to said second fluid motor while preventing the flow of fluid through the other of said valve elements to said second fluid motor.

2. Hydraulic control means comprising a fluid motor having a stationary cylinder and a movable piston and rod, a control valve contained within said rod, a second fluid motor, said second fluid motor being contained within said rod and adapted for limited axial movement relative thereto, said second fluid motor having a cylinder operatively connected to said control valve, a piston and rod contained within the cylinder of said second fluid motor, a housing integral with said cylinder of said second fluid motor, a first valve element contained within said housing for controlling the admission of fluid to said second fluid motor, a second valve element contained within said housing for controlling the admission of fluid to said second fluid motor, and valve means contained within said housing for permitting flow of fluid through one of said valve elements to said second fluid motor while preventing the flow of fluid through the other of said valve elements to said second fluid motor.

3. Hydraulic control means comprising a fluid motor having a stationary cylinder and a movable piston and rod, a control valve contained within said rod, a second fluid motor, said second fluid motor being contained within said rod and adapted for limited axial movement relative thereto, said second fluid motor having a cylinder operatively connected to said control valve, a piston and rod contained within the cylinder of said second fluid motor, a first valve element for controlling the admission of fluid to said second fluid motor, a second valve element for controlling the admission of fluid to said second fluid motor, and means for permitting flow of fluid through said first valve element to said second fluid motor while preventing the flow of fluid through said second valve element to said second fluid motor.

4. Hydraulic control means comprising a fluid motor having a stationary cylinder and a movable piston and rod, a control valve contained within said rod, a second fluid motor, said second fluid motor being contained within said rod and adapted for limited axial movement relative thereto, said second fluid motor having a cylinder operatively connected to said control valve, a piston and rod contained within the cylinder of said second fluid motor, a first valve responsive to an autopilot for controlling the admission of fluid to said second fluid motor, a second valve responsive to a rate gyro for controlling the admission of fluid to said second fluid motor, and means for permitting flow of fluid through one of said valve elements to said second fluid motor while preventing the flow of fluid through the other of said valve elements to said second fluid motor.

5. In a flight control system having a fluid motor comprising a stationary member, a movable member and a control valve carried by said movable member, the combination of a second fluid motor contained within said movable member and adapted for limited axial movement relative thereto, said second fluid motor having a cylinder operatively connected to said control valve, a piston and rod contained within the cylinder of said second fluid motor, a first valve responsive to an autopilot for controlling the admission of fluid to said second fluid motor, a second valve responsive to a rate gyro for controlling the admission of fluid to said second fluid motor, and valve means for permitting flow of fluid through one of said valve elements to said second fluid motor while preventing the flow of fluid through the other of said valve elements to said second fluid motor.

6. In a flight control system having a fluid motor comprising a stationary member, a movable member and a control valve carried by said movable member, the combination of a second fluid motor contained within said movable member and having first and second relatively movable members, said first relatively movable member being adapted for limited axial movement relative to said movable member of said first fluid motor and being operatively connected to said control valve, a first valve responsive to an autopilot for controlling the admission of fluid to said second fluid motor, a second valve responsive to a rate gyro for controlling the admission of fluid to said second fluid motor, and valve means for permitting flow of fluid through one of said valve elements to said second fluid motor while preventing the flow of fluid through the other of said valve elements to said second fluid motor.

7. In a flight control system having a fluid motor comprising a stationary member, a movable member and a control valve carried by said movable member, the combination of a second fluid motor contained within said movable member and having first and second relatively movable members, said first relatively movable member being adapted for limited axial movement relative to said movable member of said first fluid motor and being operatively connected to said control valve, a housing attached to and movable with said first relatively movable member, a first valve element contained within said housing for controlling the admission of fluid to said second fluid motor, a second valve element contained within said housing for controlling the admission of fluid to said second fluid motor, and means contained within said housing for permitting flow of fluid through one of said valve elements to said second fluid motor while preventing the flow of fluid through the other of said valve elements to said second fluid motor.

8. In a flight control system having a fluid motor comprising a stationary member, a movable member and a control valve carried by said movable member, the combination of a second fluid motor contained within said movable member and having first and second relatively movable members, said first relatively movable member being adapted for limited axial movement relative to said movable member of said first fluid motor and being operatively connected to said control valve, a housing attached to and movable with said first relatively movable member, a first valve element contained within said housing for controlling the admission of fluid to said second fluid motor, a second valve element contained within said housing for controlling the admission of fluid to said second fluid motor, means contained within said housing for permitting flow of fluid through one of said valve elements to said second fluid motor while preventing the flow of fluid through the other of said valve elements to said second fluid motor, a rate gyro mounted on said housing and operatively connected to said second valve element, and means responsive to signals from said rate gyro to actuate said second valve element.

9. In a flight control system having a fluid motor comprising a stationary member, a movable member and a control valve carried by said movable member, the combination of a second fluid motor contained within said movable member and having first and second relatively movable members, said first relatively movable member being adapted for limited axial movement relative to said movable member of said first fluid motor and being operatively connected to said control valve, a housing attached to and movable with said first relatively movable member, a first valve element contained within said housing for controlling the admission of fluid to said second fluid motor, a second valve element contained within said housing for controlling the admission of fluid to said second fluid motor, means contained within said housing for permitting flow of fluid through one of said valve elements to said second fluid motor while preventing the flow of fluid through the other of said valve elements to said second fluid motor, a pilot actuated control member connected to said second relatively movable member of said second fluid motor, and means for coupling said control member to said housing.

10. In a flight control system having a fluid motor comprising a stationary member, a movable member and a control valve carried by said movable member, the combination of a second fluid motor contained within said movable member and having first and second relatively movable members, said first relatively movable member being adapted for limited axial movement relative to said movable member of said first fluid motor and being operatively connected to said control valve, a housing attached to and movable with said first relatively movable member, a first valve element contained within said housing for controlling the admission of fluid to said second fluid motor, a second valve element contained within said housing for controlling the admission of fluid to said second fluid motor, a rate gyro mounted on said housing and operatively connected to said second valve element, and means responsive to signals from said rate gyro to actuate said second valve element.

References Cited in the file of this patent
UNITED STATES PATENTS

| | | |
|---|---|---|
| 2,705,940 | Edwards | Apr. 12, 1955 |
| 2,831,643 | Rasmussen | Apr. 22, 1958 |